3,645,906
NOVEL COMPOSITIONS OF MATTER AND METHODS FOR PREPARING THE SAME
Joseph C. Valenta and Alfred F. Steinhauer, Midland, Mich., assignors to The Dow Chemical Company, Midland, Mich.
No Drawing. Continuation-in-part of application Ser. No. 228,026, Oct. 3, 1962. This application Aug. 6, 1968, Ser. No. 750,494
Int. Cl. C11d 1/24, 7/50; D06l 1/02
U.S. Cl. 252—171                            2 Claims

ABSTRACT OF THE DISCLOSURE

The present invention involves making clear solutions of hydrophobic liquids and water or aqueous solutions of acids, bases, or salts. It is shown that an alkylated diphenyloxide sulfonic acid salt alone, if halogenated, or if unhalogenated then in combination with certain commercial surfactants, will solubilize into a clear solution a hydrophobic liquid (e.g., chlorinated hydrocarbon) and water, or a solution of an acid, base, or salt in water.

CROSS REFERENCE TO RELATED APPLICATION

This application is a continuation-in-part of Ser. No. 228,026, filed October 3, 1962, now abandoned.

BACKGROUND OF INVENTION

The literature describes techniques and compositions for combining by emulsifying oils and water. This emulsion technology is widely used industrially. However, little if any art or technology is available for preparing clear solutions of oil and water in concentrations of greater than about 5% oil-in-water or water-in-oil. Several U.S. patents disclose compositions which admit of up to about 1% water in dry-cleaning solvents. These compositions contain certain sulfonated aromatic compounds, e.g., sulfonated tricosyl phenol, sulfonated white oil, sulfonated paraffin which will form pastes with a dry cleaning solvent and water which will disperse in dry cleaning solvents. The pastes may contain as much as 70% water but are used in amounts of only about 2%, U.S. Pat. No. 2,388,962. Other patents employ mixtures of sulfonated alkylaryl polyoxyethylene and unsulfonated alkylarylpoly polyoxyethylenes to maintain as much as 70% of the water in the atmosphere over a dry cleaning solvent in the solvent before phase separation. The water content of the composition is less than 1%, U.S. Pat. 2,941,952. Another patent, No. 2,992,999, discloses the use of alkylated chlorinated diphenyloxide sulfonates to maintain slightly higher concentrations of water, about 1%, in the solvent without phase separation.

BRIEF DESCRIPTION OF INVENTION

In accordance with the present invention, a clear homogeneous solution of an organic hydrophobic liquid and water or a homogeneous solution of an organic hydrophobic liquid and an aqueous solution of an acid, base or salt can be prepared by incorporating into said compositions from 1 to about 30 parts by weight per 100 parts of ultimate composition, of a surface active agent or agents selected from the group consisting of (A) An alkali metal, alkaline earth metal, ammonium, alkylamine or an alkanolamine salt of an alkylated chlorinated diphenyl oxide mono- or polysulfonic acid; or (B) An alkali metal, alkaline earth metal, ammonium, alkylamine or an alkanolamine salt of alkylated chlorinated or unchlorinated diphenyl oxide sulfonic acids in combination with each other or in combination with one of certain commercially available anionic or nonionic surface active agents. The second surface active agent can be employed in amounts of from about 10 to 150% of the first surface active agent.

DETAILED DESCRIPTION OF THE INVENTION

The present invention provides a means for preparing solutions of oil-in-water and water-in-oil. The classes of oil or hydrophobic liquids, aqueous solutions of acids, bases and salts and surface active agents which have been found capable of combination to produce clear homogeneous solutions are hereinafter set forth in detail.

It is to be understood that water or aqueous solutions of acids, bases, or salts can be solubilized in accordance with the present invention into substantially any organic hydrophobic liquid as well as any organic hydrophobic liquid can be solubilized into water or aqueous solutions of acids, bases or salts.

The organic hydrophobic liquids which have especial commercial importance when employed in combination with water or aqueous solutions of acids, bases, or salts and which in accordance with the invention form clear solutions include the halogenated hydrocarbon solvents, exemplary of which are methylene chloride, methylene bromide, chloroform, bromoform, carbon tetrachloride, 1,1,1-trichloroethane, trichloroethylene, perchloroethylene, propylene dichloride, and the like, as well as the "Freon" type solvents which are fluoride-containing lower alkyl chlorides and bromides such as dibromodifluoromethane, and the like; the hydrocarbon solvents such as the alkanes, i.e., hexane, octane, naphtha, kerosene, and the like; the aromatic hydrocarbons, e.g., benzene, toluene, xylene, and the like; carbon bisulfide, and the naturally occurring oils, such as pine oil.

The use of the surfactant systems in accordance with the present invention permits the preparation of clear solutions of hydrophobic liquids and water including aqueous solutions of acids, bases, and or salts such as, by way of example, aqueous hydrochloric acid, sulfuric acid, acetic acid, propionic acid, ammonia, ammonium hydroxide, sodium hydroxide, potassium hydroxide, tetrapotassium pyrophosphate, and the like whether concentrated or dilute. Briefly, the compositions of this invention are clear solutions and consist essentially of 10–50 parts by weight of aqueous component, 90–20 parts by weight organic hydrophobic liquid component and 1 to 30 parts by weight of surfactant.

It has also been found that dry cleaning solutions can be prepared wherein water-sensitive fabrics can be cleaned with a composition 20 to 40 parts by weight of water in 65 to 30 parts halogenated hydrocarbon or other cleaning solvent by incorporating the surfactant compositions of the present invention in from about 15 to 30 parts by weight. These compositions show superior ability to clean heavily soiled water-sensitive fabrics without damage to the latter.

The alkylated diphenyl oxide sulfonates which have been found to be the key to the present invention are those having the generic formula

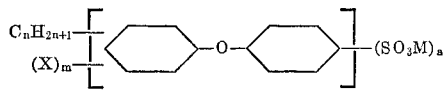

wherein X represents a halogen having an atomic number from 17 to 35, $n$ represents an integer from about 6 to about 22, $m$ represents an integer from 0 to 1, $a$ represents an integer from 1 to 2, M represents one equivalent of an anion selected from the group consisting of alkali metals, alkaline earth metals, ammonium, alkylamines, and alkanolamines. Representative of the compounds described above are: sodium nonyldiphenyl oxide monosulfonate, potassium pentadecylchlorodiphenyl oxide monosulfonate, lithium dodecyldiphenyl oxide sulfonate, triethanolamine 2-octadecylchlorodiphenyl oxide monosulfonate, magnesium dodecylchlorodiphenyl oxide disulfonate; ammonium nonyldiphenyl oxide monosulfonate; diethanolamine salt of dodecylidiphenyl oxide monosulfonic acid; triethylamine salt of dodecyldiphenyl oxide disulfonic acid; tripropylamine salt of tridecyl monochlorodiphenyl oxide monosulfonic acid, and the like, to name only a few.

The classes of commercially known surfactants which can be employed in accordance with the present invention in combination with the alkylated diphenyl oxide sulfonic acid salts are the anionic alkali metal and ammonium or alkyl or alkanolamine salts of the N-fatty acid N-alkylamine alkanoic acid esters, alkylaryl sulfonates, fatty alcohol sulfates, petroleum sulfonates, and, the non-ionic alkylphenolalkylene oxide condensates and their sulfonated salts. The specific structure of many of these materials is not known, it generally being maintained as trade-secret within the producer's organization. Therefore, in many instances the user has only the trade name and a generic description such as given in Surfactants Listed, by John W. McCutcheon, Soap & Chemical Specialties, 4th revision, December 1957, January, February, March, and April 1958, and McCutcheon, Detergents & Emulsifiers . . . up to date, 1962. The following is only a partial list of the surfactants under enumerated generic classes of operable materials:

Alkali metal N-fatty acid N-alkyl amide-sodium N-coconut oil acid-N-methyl taurate (Igepon TC-42); sodium N-coconut oil acid-β-amino propionate (Deriphat 151); sodium N-cyclohexyl-N-palmitoyl taurate (Igepon CN-42); sodium coconut acid ester isethionate (Igepon AC-78);

Alkylaryl sulfonates—sodium alkylnaphthalene sulfonate (Petro AA) (Naccosol A) (Morcowet 469), sodium alkylbenzene sulfonate (Ultrawet K);

Alkylphenol—ethylene oxide condensates (Dowfax 9N9, 9N4, etc.); commonly referred to as alkylphenoxy-polyalkyleneoxyalkanols (Igepal CO-633-Antara);

Alkali metal fatty alcohol sulfates—sodium 2-ethyl-1-hexyl sulfate (Tergitol 08); sodium lauryl sulfate (Duponol ME); sodium octyl sulfate (Duponol 80); sodium sec. alkyl sulfate (Teepol);

Alkali metal petroleum sulfonates—Petronate K, CR, HL; Petromix No. 9, No. 1C; Petrosul 745;

Sulfated fatty esters—dioctyl ester of sodium salt of sulfosuccinic acid (Aerosol OT); a sulfated fatty ester (Burkem 288);

Sulfated esters of alkylphenol-alkylene oxide condensates, e.g., nonylphenol condensed with ethylene oxide (4 to 20 moles) sodium sulfate ester, such as Alipal CO-433, Stepanol B-153, Sole Terge 311;

N-fatty trialkyl ammonium halides—Aliquat 26, Acetoquat CTAB.

It is to be understood that the above list is not complete and equivalent materials of other manufacturers can be employed with equally good results in place of those whose trade names are cited.

The proportions of the surface active compounds necessary to solubilize water or aqueous solutions in the organic hydrophobic solvents vary widely with the nature of the solvent, solute, and the surface active material. Thus, when it is desired to solubilize water into the chlorinated solvents, the surfactant or surfactants are employed in amounts from about 1 to 30% by weight of the ultimate composition. It is to be understood that when a second surface active material is employed, it can be present in amounts of from 10 to 150% of the first surfactant. The second material can replace oftentimes as much as 50% of the diphenyl oxide "sulfonate." When aqueous acids, bases, or salts are employed, the amount of surfactants remains generally within the same range but is usually preferably in order of about 5 to 30% by weight. The already mentioned decrease in diphenyl oxide "sulfonate" surfactant can be made by using a two-component surfactant system.

The following examples illustrate the present invention but are not to be construed as limiting.

EXAMPLE 1

To illustrate the solubilizing effect of the alkylated halogenated diphenyl oxide sodium sulfonates alone, the following compositions were prepared:

| | Grams |
|---|---|
| Surfactant | 3 |
| Methylene chloride | 12 |
| Water | x |

The surfactant and methylene chloride were mixed together and water added in 1 gram increments until the first haze occurred. The amount of water listed below is 1 gram less than that amount at which first haze appeared.

Surfactant

| Sodium salt of alkylchlorodiphenyl oxide sulfonic acid (alkyl substituent): | Water, grams |
|---|---|
| Dodecyl | 12 |
| 2-octadecyl | 4 |
| 2-nonyldecyl | 6 |
| Hexyl | 8 |
| n-Nonyl | 4 |
| Nonyl(tripropylene) | 10 |

In order to point out the efficient, unexpected and unobvious results above, commercial surfactants were substituted for the "sulfonate" above with the following results:

| Surfactant | Water, grams |
|---|---|
| Dioctyl ester of sodium sulfosuccinic acid (Aerosol OT). | Haze formed on addition of 1 gram of water. |
| Alkylbenzene sodium sulfonate (Ultrawet K). | Two phase when surfactant added, haze formed on addition of 1 gram of water. |

EXAMPLE 2

To illustrate the effect the sodium dodecylchlorodiphenyl oxide sulfonate has in activating the various commercial surfactants which alone would not produce a clear solution, the following formulation was prepared and the named second surfactant added until the solution became clear:

| | Grams |
|---|---|
| Sodium dodecylchlorodiphenyl oxide sulfonate (100% active ingredient) | 0.7 |
| Methylene chloride | 4.6 |
| Water | 4.6 |
| Surfactant B | x |

Second surfactant:                                                  Amt., grams
  Sodium N-coconut acid-N-methyl taurate as
    24% active ingredient sold commercially as
    Igepon TC-42 _____ 0.6
  Alkylnaphthalene sulfonate as 50% active in-
    gredient sold commercially as Petro AA ____ 0.9
  Sodium octyl sulfonate as 75% active material
    sold commercially as Duponol 80 _____ 0.3
  Sodium 2-ethyl-1-hexyl sulfate as 38% active
    ingredient sold commercially as Tergitol 08  0.6
  Sodium sec. alkyl sulfonate as 34% active in-
    gredient sold commercially as Teepol _____ 0.7
  Sodium alkyl naphthalene sulfonate as 100%
    active ingredient sold commercially as Nac-
    cosol A _____ 0.5
  Sodium N-coco-β-amino propionate as 100%
    active ingredient sold commercially as Deri-
    phat 151 _____ 0.4
  Coconut oil acid of soidum isethionate 100% ac-
    tive sold commercially as Igepon AC-78 __ 0.25
  Sodium oleate 100% active _____ 0.1
  Sodium dodecyldiphenyl oxide disulfonate 50%
    active ingredient _____ 0.4
  Sodium alkylnaphthalene sulfonate 100% active
    ingredient sold commercially as Morcowet
    469 _____ 0.4
  Sodium lauryl sulfate 100% active ingredient
    sold commercially as Duponol ME _____ 0.1

In another series of tests employing the same formulation except that the sodium dodecylchlorodiphenyl oxide sulfonate was reduced to 0.3 gram. Initially, a haze developed indicating 0.3 gram was insufficient to solubilize 50% by weight water in the hydrocarbon. A second surfactant, which would not solubilize water in the hydrocarbon solvent, was added. The amount of the second surfactant to clear the solution is indicated in the table below:

| Second surfactant | Amount, grams | Total surfactant in system |
|---|---|---|
| Aerosol OS (Isopropyl naphthalene sodium sulfonate) | 0.5 | 0.8 |
| Ninol 1001 (Fatty acid alkanol amide) | 0.7 | 1.0 |

Neither of the second surfactants, is any proportion alone, would produce a clear solution.

EXAMPLE 3

The following table lists some of the various solvents and aqueous acid, base, or salt systems which can be prepared as clear solutions when combined in accordance with the present invention:

| Grams aqueous component | Grams organic component | Grams, minimum amount surfactant required to form clear solution | |
|---|---|---|---|
| | | A | B |
| 18.0 H$_2$O | 12.0 1,1,1-trichloroethane | [1] 3.0 | 0 |
| 7.5 H$_2$O | 7.5 1,1,1-trichloroethane | [1] 1.2 | 0 |
| 4.0 H$_2$O | 12.0 methylene dichloride | [2] 3.0 | 0 |
| 6.0 H$_2$O | do | [3] 3.0 | 0 |
| 8.0 H$_2$O | do | [4] 3.0 | 0 |
| 4.0 H$_2$O | do | [5] 3.0 | 0 |
| 10.0 H$_2$O | do | [6] 3.0 | 0 |
| 10.0 H$_2$O | 12.0 perchloroethylene | [7] 3.0 | 0 |
| 8.0 H$_2$O | 12.0 propylene dichloride | [7] 3.0 | 0 |
| 14.0 H$_2$O | 12.0 trichloroethylene | [7] 3.0 | 0 |
| 30.0 H$_2$O | 12.0 methyl ethyl ketone | [7] 3.0 | 0 |
| 18.0 H$_2$O | 12.0 1,1,1-trichloroethane | [7] 3.0 | 0 |
| 8.0 H$_2$O | 12.0 ethyl acetate | [7] 3.0 | 0 |
| 35.0 H$_2$O | 5.0 carbon disulfide | [7] 3.0 | [8] 0.8+[9] 0.6 |
| 5.0 H$_2$O | do | [10] 0.5 | [8] 0.9+[9] 0.6 |
| 5.0 H$_2$O | do | [1] 0.5 | [9] 0.5+[8] 0.3+[11] 0.14 |
| 50.0 H$_2$O | 50.0 carbon disulfide | [1] 5.0 | [8] 3.0+[9] 5.5+[12] 0.5 |
| 50.0 H$_2$O | do | [1] 5.0 | [8] 3.5+[9] 6.0+[13] 0.5 |
| 10.0 H$_2$O | 4.0 1,1,1-trichlorethane | [1] 1.0 | [9] 0.3 |
| 3.83 H$_2$O+0.43 NaOH | 3.6 1,1,1-trichloroethane | [1] 0.7 | [9] 1.4 |

| Grams aqueous component | Grams organic component | Grams, minimum amount surfactant required to form clear solution | |
|---|---|---|---|
| | | A | B |
| 5.0 H$_2$O+0.9 NaOH | 2.7 perchloroethylene | [1] 0.6 | [9] 0.78 |
| 4.7 H$_2$O+0.3 38% aqueous NH$_4$OH | 4.7 methylene chloride | [10] 0.8 | [9] 0.4 |
| 4.7 H$_2$O+0.3 28% aqueous NH$_4$OH | do | [14] 0.8 | [15] 0.05 |
| 37.5 H$_2$O+3.2 HCL | 44.5 perchloroethylene | [1] 6.6 | [9] 8.1 |
| 41.6 H$_2$O+11.4 H$_2$SO$_4$ | 28.2 perchloroethylene | [1] 7.0 | [9] 11.8 |

[1] Sodium dodecylchlorodiphenyl oxide sulfonate.
[2] Sodium 2-octadecylchlorodiphenyl oxide sulfonate.
[3] Sodium α-methyl octylchlorodiphenyl oxide sulfonate.
[4] Sodium hexylchlorodiphenyl oxide sulfonate.
[5] Sodium n-nonylchlorodiphenyl oxide sulfonate.
[6] Sodium nonylchlorodiphenyl oxide sulfonate.
[7] Sodium pentadecychlorodiphenyl oxide sulfonate.
[8] Nonylphenol condensed with nine moles ethylene oxide.
[9] Sodium dodecyldiphenyl oxide disulfonate.
[10] Diethanolamine salt of dodecylchlorodiphenyl oxide sulfonate.
[11] Coconut oil acid ester of Na isethionate.
[12] Sodium oleate.
[13] Sodium lauryl sulfate.
[14] Sodium dodecyldichlorodiphenyl oxide sulfonate.
[15] Sodium pentadecyldiphenyl oxide disulfonate.

EXAMPLE 4

The following examples illustrate the solubilizing effect of the surfactant of the present invention in carrying aqueous tetrapotassium pyrophosphate (TKPP) into organic oils to prepare clear, stable solutions.

| Percent by weight of total composition | | | |
|---|---|---|---|
| H$_2$O | Pine oil | TKPP | Surfactant |
| 44.0 | 28.4 | 12.5 | [1] 15.0 |
| 52.2 | 24.7 | 3.6 | 19.5 |
| 38.6 | 23.0 | 16.9 | [2] 21.6 |
| 39.2 | 36.0 | 10.8 | [1] 14.0 |
| 42.6 | 23.8 | 10.5 | [5] 6+[2] 17.5 |
| 50.8 | 32.7 | [3] 2.89 | [1] 7.7+[2] 5.9 |
| 50.1 | 32.0 | [4] 3.75 | [5] 7.5+[2] 6.6 |
| 34.4 | 26.0 | 19.0 | [5] 6.1+[2] 14.5 |
| 46.9 | 29.8 | 6.58 | [2] 9.63+[6] 7.0 |

[1] Sodium dodecylchlorodiphenyl oxide sulfonate.
[2] Sodium dodecyldiphenyl oxide sulfonate.
[3] Sodium tripolyphosphate.
[4] Sodium pyrophosphate.
[5] Diethylene salt of sodium dodecylchlorodiphenyl oxide sulfonate.
[6] Nonylphenol condensed with nine moles of ethylene oxide.

The various compositions described in the foregoing specification have many uses as, for example, cleaning where both water soluble and oil soluble materials are encountered, household cleaning, paint stripping compositions, acid cleaning, alkali cleaning, solvent compositions for combining both water and oil soluble ingredients in solution, and the like.

EXAMPLES 5-12

Various concentrations of perchloroethylene, water, and sodium dodecylchlorodiphenyl oxide monosulfonate were prepared by mixing the ingredients with gentle warming until a clear solution was obtained. The solutions each had a slight to bright yellow appearance, but were clear even on standing for more than 24 hours.

ACH 115 standard soiled cotton strips 1½ inches by 5 inches were washed by hand by applying the solution to the fabric then gently pressing and rubbing the strips between the fingers. After about 3 minutes, the strips were rinsed four times with fresh perchloroethylene, each time rubbing them between the fingers to insure complete rinsing. They were then air-dried and the degree of whiteness measured in reflectance units by using a Photovolt Model 610 Reflectometer. The results of such tests are tabulated below:

Composition of cleaning fluid, percent by weight

| Example No. | Perchloroethylene | Surfactant [1] | H₂O | Reflectance units |
|---|---|---|---|---|
| 5 | Soiled cloth before washing | | | 26 |
| 6 | 100 | | | 33 |
| 7 | 75 | 25 | | 33 |
| 8 | 90 | 5 | 5 | 33 |
| 9 | 65 | 15 | 20 | 46 |
| 10 | 55 | 25 | 20 | 46.5 |
| 11 | 40 | 25 | 35 | 53 |
| 12 | [2] 30 | 30 | 40 | 53 |

[1] Sodium dodecylchlorodiphenyl oxide monosulfonate.
[2] This solution was not clear and separated on standing overnight.

EXAMPLE 13

In another test five bow ties and one wool four-in-hand tie having natural skin oil and soil stains were washed in the manner of Examples 1–8 and on visual observation were found to be bright and clean and have a like-new appearance in contrast to normally dry-cleaned ties.

Other materials which can be cleaned by using the compositions of the present invention are, for example, wool, silk, synthetic fabrics, and the like.

The compositions are also useful as spotting agents prior to regular dry cleaning.

Similarly advantageous results are obtained when other cleaning solvents are used, such as, for example, trichloroethylene, methylchloroform, carbon tetrachloride, petroleum solvents, and the like.

We claim:

1. A composition for cleaning water-sensitive fabrics consisting essentially of a clear solution of
   (a) 15 to 30 weight percent of sodium didecylchlorodiphenyloxide monosulfonate;
   (b) 20 to 40 weight percent of water; and
   (c) 65 to 30 weight percent of a chlorinated hydrocarbon dry-cleaning solvent.

2. A cleaning composition consisting essentially of a clear solution of about: 40 percent by weight perchloroethylene; 25 percent by weight sodium dodecylchlorodiphenyl oxide monosulfonate; and 35 percent by weight water.

References Cited

UNITED STATES PATENTS

| | | | |
|---|---|---|---|
| 2,941,952 | 6/1960 | Lewis et al. | 252—161 |
| 1,911,289 | 5/1933 | Reddish | 8—42 |
| 2,081,876 | 5/1937 | Prahl | 252—161 |
| 2,388,962 | 11/1945 | Flett | 252—161 |
| 2,450,505 | 10/1948 | Fisher | 252—161 |
| 2,854,477 | 9/1938 | Steinhauer | 252—161 |
| 2,980,624 | 4/1961 | Miller | 252—161 |
| 2,990,375 | 6/1961 | Steinhauer | 252—167 |
| 2,992,999 | 7/1961 | Smith et al. | 252—161 |
| 3,175,949 | 3/1965 | Siegal | 252—316 X |

OTHER REFERENCES

Condensed Chemical Dictionary (6th edition), 1961, pp. 73, 1043, 888, 585, 738.

Industrial Detergency, edited by Wm. W. Niven, Jr., 1955, pp. 82–91.

LEON D. ROSDOL, Primary Examiner

D. L. ALBRECHT, Assistant Examiner

U.S. Cl. X.R.

8—142; 252—138, 153, 158, 161, 353, DIGEST 14

UNITED STATES PATENT OFFICE
CERTIFICATE OF CORRECTION

Patent No. 3,645,906      Dated   29 Feb. 1972

Inventor(s)   Joseph C. Valenta and Alfred F. Steinhauer

It is certified that error appears in the above-identified patent and that said Letters Patent are hereby corrected as shown below:

Column 3, line 25, change "dodecylidiphenyl" to --dodecyldiphenyl--.

Column 5, line 19, delete "soidum" and insert --sodium--.

Column 6, table between lines 35 and 45, change the 7th line under the column headed "Surfactant" to:
$$--7.55 + 6.6^2--.$$

Column 8, line 1, delete "didecylchloro-" and insert --dodecylchloro- --.

Signed and sealed this 12th day of September 1972.

(SEAL)
Attest:

EDWARD M. FLETCHER, JR.
Attesting Officer

ROBERT GOTTSCHALK
Commissioner of Patents